US012680631B2

(12) United States Patent \
Sotowa et al.

(10) Patent No.: US 12,680,631 B2 \
(45) Date of Patent: Jul. 14, 2026

(54) LAMINATED HOSE

(71) Applicant: BRIDGESTONE CORPORATION, Tokyo (JP)

(72) Inventors: Takashi Sotowa, Tokyo (JP); Taisuke Kuroda, Tokyo (JP); Akira Miyawaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 525 days.

(21) Appl. No.: 18/255,174

(22) PCT Filed: Oct. 14, 2021

(86) PCT No.: PCT/JP2021/038142

§ 371 (c)(1), \
(2) Date: May 31, 2023

(87) PCT Pub. No.: WO2022/123906

PCT Pub. Date: Jun. 16, 2022

(65) Prior Publication Data

US 2023/0407997 A1 Dec. 21, 2023

(30) Foreign Application Priority Data

Dec. 11, 2020 (JP) ................................. 2020-206341

(51) Int. Cl. \
F16L 11/08 (2006.01)

(52) U.S. Cl. \
CPC ................................... F16L 11/083 (2013.01)

(58) Field of Classification Search \
CPC .................................................... F16L 11/083

USPC .......................................................... 138/133 \
See application file for complete search history.

(56) References Cited

U.S. PATENT DOCUMENTS

| | | | | | |
|---|---|---|---|---|---|
| 301,417 | A | * | 7/1884 | Wilkinson | ............ F16L 11/127 138/131 |
| 1,973,756 | A | * | 9/1934 | Gish | ...................... F16L 11/088 138/133 |
| 1,984,475 | A | * | 12/1934 | Goodall | ............... B29D 23/001 138/133 |

(Continued)

FOREIGN PATENT DOCUMENTS

| | | |
|---|---|---|
| CN | 103697251 A | 4/2014 |
| JP | S5817283 A | 2/1983 |

(Continued)

OTHER PUBLICATIONS

Apr. 29, 2024, search result of the Extended European Search Report issued by the European Patent Office in the corresponding European Patent Application No. 21903010.3.

(Continued)

*Primary Examiner* — David R Deal \
(74) *Attorney, Agent, or Firm* — KENJA IP LAW PC

(57) ABSTRACT

To provide a laminated hose capable of achieving both pressure-resistant performance and oscillating durability performance. The laminated hose (1) comprises a plurality of reinforcing layers (12) laminated to the hose body (11), and each of the plurality of reinforcing layers (12) includes a reinforcing wire (13). A wire density ($\rho$) of the reinforcing layer (12) in all of the plurality of reinforcing layers (12) is 90% or more and less than 96%.

13 Claims, 2 Drawing Sheets

(56)                    References Cited

U.S. PATENT DOCUMENTS

| | | | | |
|---|---|---|---|---|
| 3,948,293 | A * | 4/1976 | Bixby .................... | F16L 11/085 138/133 |
| 4,384,595 | A * | 5/1983 | Washkewicz ......... | F16L 11/082 428/36.2 |
| 11,085,560 | B2 | 8/2021 | Yusa | |
| 2003/0178085 | A1 * | 9/2003 | Burke .................... | F16L 59/141 138/143 |
| 2010/0032047 | A1 * | 2/2010 | Mennig ................. | F16L 11/085 138/143 |
| 2015/0090358 | A1 * | 4/2015 | Lamontia .............. | F16L 11/087 138/125 |
| 2020/0149663 | A1 | 5/2020 | Yusa | |

FOREIGN PATENT DOCUMENTS

| | | | |
|---|---|---|---|
| JP | S61192988 | A | 8/1986 |
| JP | H04288920 | A | 10/1992 |
| JP | H0926062 | A | 1/1997 |
| JP | H10185018 | A | 7/1998 |
| JP | H11141751 | A | 5/1999 |
| JP | 2013151994 | A | 8/2013 |
| JP | 2018025236 | A | 2/2018 |
| JP | 2018194068 | A | 12/2018 |

OTHER PUBLICATIONS

Jun. 13, 2023, International Preliminary Report on Patentability issued in the International Patent Application No. PCT/JP2021/038142.

Mar. 26, 2025, search result of Office Action issued by the China National Intellectual Property Administration in the corresponding Chinese Patent Application No. 2021800830814.

Dec. 28, 2021, International Search Report issued in the International Patent Application No. PCT/JP2021/038142.

* cited by examiner

LAMINATED HOSE

TECHNICAL FIELD

This disclosure relates to a laminated hose.

BACKGROUND

A laminated hose includes, for example, a high-pressure hose with a reinforcing layer formed by spirally wound reinforcing wires (see, for example, PTL 1 and PTL 2). The high-pressure hose includes a plurality of reinforcing layers laminated on the inner tube rubber layer. Such high-pressure hose must be densely wound with the reinforcing wires in each of the reinforcing layers to ensure pressure-resistant performance and durability performance.

CITATION LIST

Patent Literature

PTL 1: 2013-151994A
PTL 2: H9-26062A

SUMMARY

Technical Problem

However, increasing the density of the reinforcing wires will reduce the flexibility of the laminated hose. As a result, the durability performance of the laminated hose may be rather reduced due to the increased density of the reinforcing wires. For example, the durability performance of the laminated hose includes what is called oscillating durability performance. The oscillating durability performance refers to the durability performance when internal pressure is applied to the laminated hose while repeatedly bending the hose. The oscillating durability performance may be rather reduced if the flexibility of the laminated hose is decreased by the increased density of the reinforcing wires.

Based on this, a lower density of reinforcing wires could be considered. However, a lower density of reinforcing wires may result in lower pressure-resistant performance. In addition, when the density of the reinforcing wires was reduced, it tended to be difficult for the reinforcing wires to line up evenly during manufacturing. Therefore, there is room for improvement in terms of achieving both pressure-resistant performance and oscillating durability performance in the conventional laminated hoses by improving oscillating durability performance while ensuring pressure-resistant performance.

The purpose of this disclosure is to provide a laminated hose that can achieve both pressure-resistant performance and oscillating durability performance.

Solution to Problem

The laminated hose according to this disclosure is a laminated hose comprising a hose body and a plurality of reinforcing layers laminated on the outer circumferential side of the hose body, and each of the plurality of reinforcing layers includes a reinforcing wire, wherein a wire density of the reinforcing layer in all of the plurality of reinforcing layers is 90% or more and less than 96%. According to the laminated hose of this disclosure, it is possible to achieve both pressure-resistant performance and oscillating durability performance.

The laminated hose according to this disclosure is a laminated hose comprising a hose body and a plurality of reinforcing layers laminated on the outer circumferential side of the hose body, and each of the plurality of reinforcing layers includes a reinforcing wire, wherein a wire density of the reinforcing layer in all of the plurality of reinforcing layers is 90% or more and less than 95%. According to the laminated hose of this disclosure, it is possible to achieve both pressure-resistant performance and oscillating durability performance.

In the laminated hose according to this disclosure, it is preferable that the wire density of the reinforcing layer in each of the plurality of reinforcing layers decreases from the innermost reinforcing layer closest to the hose body to the outermost reinforcing layer farthest from the hose body. In this case, both pressure-resistant performance and oscillating durability performance can be effectively achieved.

In the laminated hose according to this disclosure, it is preferable that a winding angle of the reinforcing wire in each of the plurality of reinforcing layers is 40° or more and 70° or less. In this case, 50° or more and 60° or less is particularly preferrable.

In the laminated hose according to this disclosure, it is preferable that the wire density of the reinforcing layer in each of the plurality of reinforcing layers does not exceed 100% when the laminated hose is bent at a bending radius determined by the specifications of the laminated hose. In this case, oscillating durability performance can be further improved.

In the laminated hose according to this disclosure, it is preferable that the laminated hose is a wire spiral hose including the reinforcing wire wound in a spiral shape. In this case, the laminated hose can be manufactured simply.

Advantageous Effect

According to this disclosure, it is possible to provide a laminated hose that can achieve both pressure-resistant performance and oscillating durability performance.

DETAILED DESCRIPTION

The laminated hoses according to various embodiments of this disclosure are described below with reference to the drawings.

Figure 1:
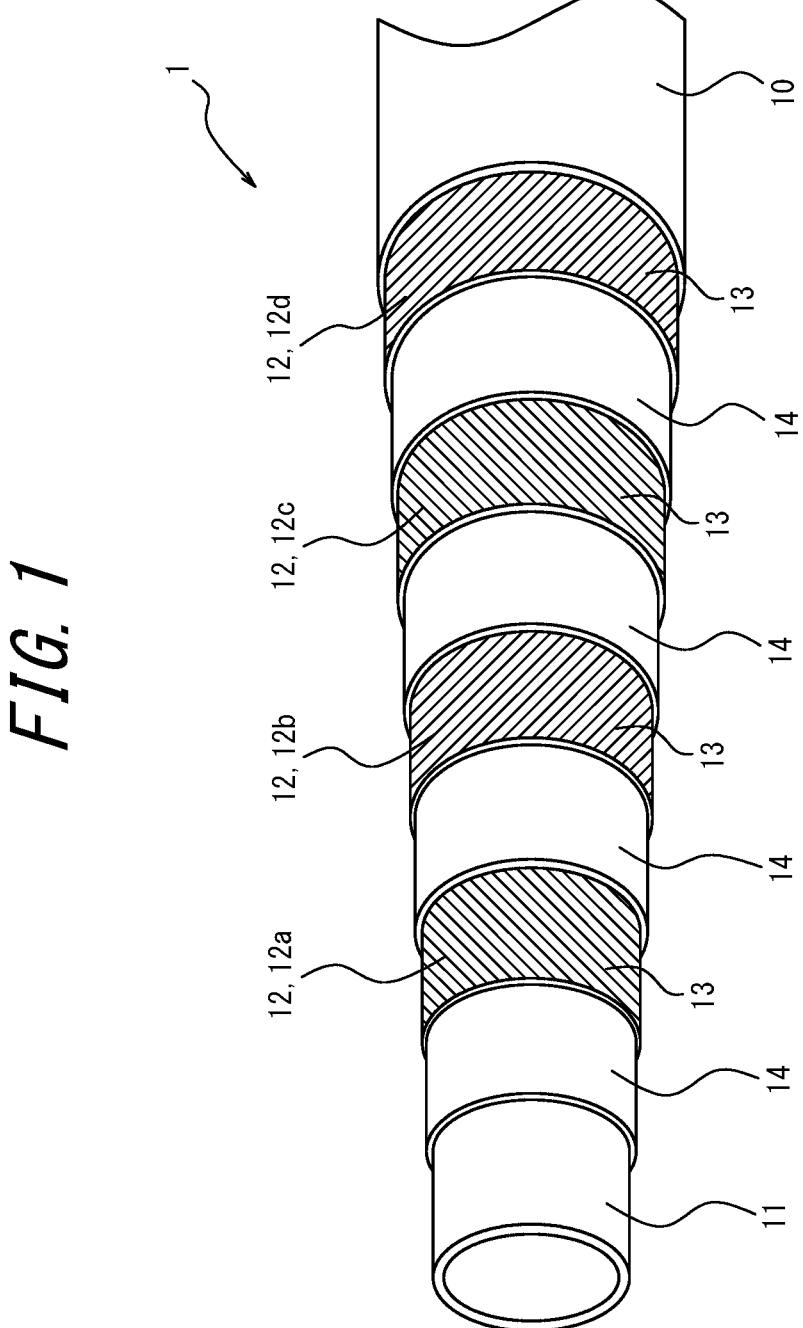
FIG. 1 is a partial perspective view schematically illustrating the internal structure of the laminated hose according to the first embodiment of the present disclosure.

FIG. 1 is a partial perspective view schematically illustrating the internal structure of the laminated hose according to the first embodiment of the present disclosure. As illustrated in FIG. 1, the laminated hose 1 comprises a hose body 11 and a plurality of reinforcing layers 12 laminated on the outer circumferential side of the hose body 11, and each of the plurality of reinforcing layers 12 includes a reinforcing wire 13.

In this embodiment, the laminated hose 1 consists of a plurality of cylindrical layers stacked concentrically. The laminated hose 1 functions as a flow path for distributing fluids and can also be used, for example, as a hydraulic hose. Specifically, the laminated hose 1 is used as a high-pressure hose for distributing hydraulic oil from a pump in a device that is operated using hydraulic pressure.

The following is a more specific description of the laminated hose 1.

In FIG. 1, the sign 11 refers to the hose body, as described above. The hose body 11 is an inner layer arranged on the innermost side in the cylindrical layers that configure the laminated hose 1. In this embodiment, the hose body 11 is an inner rubber layer containing rubber, i.e., a rubber member. In this embodiment, the inside of the hose body 11 is filled with high-pressure hydraulic oil, i.e., liquid. The hydraulic fluid can, for example, transmit supply pressure from a hydraulic pump to a device, e.g., construction equipment, that operates using the pressure of the hydraulic fluid and operate the device.

The sign 12 refers to the reinforcing layers 12. The reinforcing layers 12 are intermediate layers between the inner and outer layers of the laminated hose 1, among the cylindrical layers that configure the laminated hose 1. The reinforcing layers 12 include reinforcing wires 13. In this embodiment, the reinforcing wires 13 consists of steel wire, i.e., wire rope, wound in a spiral/helical shape. The pressure-resistant performance of the laminated hose 1 is enhanced by the reinforcing layers 12.

In this embodiment, the laminated hose 1 is provided with a plurality of reinforcing layers 12 to further enhance its pressure-resistant performance. This allows the laminated hose 1 to handle high pressures, for example, of 80 MPa or higher. In this embodiment, the laminated hose 1 comprises four reinforcing layers 12. As illustrated in FIG. 1, the winding direction of the reinforcing wire 13 in each of the four reinforcing layers 12 is opposite each other to the winding direction of the reinforcing wire 13 in the adjacent reinforcing layer 12 in the hose thickness direction, i.e., hose radial direction. This allows the laminated hose 1 to handle high pressures of, for example, 112 MPa to 168 MPa.

In this embodiment, the four reinforcing layers 12 are respectively a first reinforcing layer 12a, a second reinforcing layer 12b, a third reinforcing layer 12c, and a fourth reinforcing layer 12d. The first reinforcing layer 12a is the innermost reinforcing layer closest to the hose body 11. The second reinforcing layer 12b is an intermediate reinforcing layer farther from the hose body 11 than the first reinforcing layer 12a. The third reinforcing layer 12c is an intermediate reinforcing layer farther from the hose body 11 than the second reinforcing layer 12b. The fourth reinforcing layer 12d is the outermost reinforcing layer farther from the hose body 11 than the third reinforcing layer 12c. In this embodiment, the fourth reinforcing layer 12d is the furthest reinforcing layer from the hose body 11.

The sign 10 refers to the outer sheath layer. The outer sheath layer 10 is the outer layer arranged on the outermost side in the cylindrical layers that configure the laminated hose 1. In this embodiment, the outer sheath layer 10 is a rubber layer containing rubber, i.e., rubber member. The outer sheath layer 10 is integrally formed with the hose body 11 via reinforcing layers 12 and intermediate rubber layers 13.

The laminated hose 1 may also comprise six reinforcing layers 12. In this case, the laminated hose 1 can handle high pressures of, for example, 112 MPa to 168 MPa.

When there are six reinforcing layers 12, those six reinforcing layers 12 are respectively a first reinforcing layer 12a, a second reinforcing layer 12b, a third reinforcing layer 12c, a fourth reinforcing layer 12d, a fifth reinforcing layer 12e omitted in the figures, and a sixth reinforcing layer 12f omitted in the figures. The first reinforcing layer 12a is the innermost reinforcing layer closest to the hose body 11. The second reinforcing layer 12b is an intermediate reinforcing layer farther from the hose body 11 than the first reinforcing layer 12a. The third reinforcing layer 12c is an intermediate reinforcing layer farther from the hose body 11 than the second reinforcing layer 12b. The fourth reinforcing layer 12d is an intermediate reinforcing layer farther from the hose body 11 than the third reinforcing layer 12c. The fifth reinforcing layer 12e is an intermediate reinforcing layer farther from the hose body 11 than the fourth reinforcing layer 12d. The sixth reinforcing layer 12f is the outermost reinforcing layer farther from the hose body 11 than the fifth reinforcing layer 12e. In this embodiment, the sixth reinforcing layer 12f is the furthest reinforcing layer from the hose body 11.

The sign 14 refers to the intermediate rubber layers. The intermediate rubber layers 14, similarly to the reinforcing layers 12, are intermediate layers between the inner and outer layers of the laminated hose 1, among the cylindrical layers that configure the laminated hose 1. In this embodiment, the intermediate rubber layers 14 are rubber member containing rubber. In this embodiment, the intermediate rubber layers 14 include four intermediate rubber layers 14. The four intermediate rubber layers 14 are respectively disposed between the hose body 11 and the first reinforcing layer 12a, between the first reinforcing layer 12a and the second reinforcing layer 12b, between the second reinforcing layer 12b and the third reinforcing layer 12c, and between the third reinforcing layer 12c and the fourth reinforcing layer 12d.

In the laminated hose 1 provided with the plurality of reinforcing layers 12 which are stacked, increasing the wire density p of the reinforcing layers 12 can ensure the pressure-resistant performance of the laminated hose 1, however may also reduce the oscillating durability performance thereof.

Based on that, if the wire density of the reinforcing layer in all of the plurality of reinforcing layers 12 in the laminated hose 1 is 90% or more and less than 96%, oscillating durability performance can be improved while maintaining the wire density ρ to ensure pressure-resistant performance. Therefore, according to the laminated hose 1, oscillating durability performance can be improved while ensuring pressure-resistant performance. This allows laminated hose 1 to achieve both pressure-resistant performance and oscillating durability performance. In addition, when the density ρ was reduced in the conventional configuration, it tended to be difficult for the reinforcing wires to line up evenly during manufacturing. In contrast, in the laminated hose 1, the wire density ρ of each of the reinforcing layers 12 is increased to a certain density, which facilitates even alignment of the reinforcing wires 13 during manufacturing. Thereby, the quality of the laminated hose 1 becomes uniform.

In addition, if the wire density of the reinforcing layer in all of the plurality of reinforcing layers 12 in the laminated hose 1 is 90% or more and less than 95%, oscillating durability performance can be improved while maintaining the wire density ρ to ensure pressure-resistant performance.

Therefore, according to the laminated hose 1, oscillating durability performance can be improved while ensuring pressure-resistant performance. This allows laminated hose 1 to achieve both pressure-resistant performance and oscillating durability performance. Further, the laminated hose 1 with the above wire density ρ also facilitates even alignment of the reinforcing wires 13 during manufacturing. Thereby, the quality of the laminated hose 1 becomes uniform.

The wire density ρ of the reinforcing layer 12 is the ratio (%) of the area Sw of the reinforcing wires 13 per unit area S12 of the reinforcing layer 12. The unit area S12 of the reinforcing layer 12 can be expressed as any area of the reinforcing layer 12 when the laminated hose 1 is viewed in a plane. Alternatively, the unit area S12 of the reinforcing layer 12 can be expressed as any area of the reinforcing layer 12 when the reinforcing layer 12 is expanded.

Figure 2:
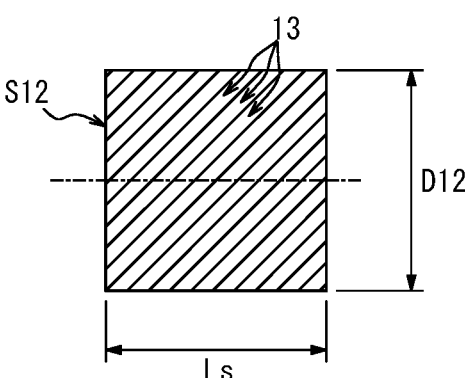
FIG. 2 schematically illustrates a part of the reinforcing layer of the laminated hose illustrated in FIG. 1.

FIG. 2 schematically illustrates a part of the reinforcing layer 12 of the laminated hose 1. FIG. 2 illustrates a plan view of the reinforcing layer 12, but a development view of the reinforcing layer 12 has a similar composition. As a specific example, the unit area S12 may be determined by the product (Ls*D12) of a certain length Ls along the extending direction d1 of the laminated hose 1 and the diameter D12 of the reinforcing layer 12 when the laminated hose 1 is extended in a straight line.

However, the method for calculating the unit area S12 of the reinforcing layer 12 is not limited to this specific example. For example, the wire density ρ of the reinforcing layer 12 may be calculated using four parameters: (1) the winding diameter Dw of the reinforcing wires 13, (2) the wire size (diameter) D13 of the reinforcing wire 13, (3) the number of reinforcing wires N13, and (4) the winding angle A13 of the reinforcing wires 13.

An exemplary formula for calculating the wire density ρ of the reinforcing layer 12 is as follows.

$$\rho = dK / \{\pi * (WOD - d) * \cos\theta\} * 100(\%)$$

ρ: wire density, d: wire diameter (mm), K: number of strikes (pcs), WOD: braided outer diameter (mm), and θ: braid angle In addition, in the laminated hose 1, it is preferable that the wire density 13 of the reinforcing layer 12 in each of the plurality of reinforcing layers 12 decreases from the innermost reinforcing layer 12a closest to the hose body 11 to the outermost reinforcing layer 12d farthest from the hose body 11. In this case, pressure-resistant performance can be effectively enhanced by increasing the wire density ρ inside the laminated hose 1, which is easily subjected to pressure. On the other hand, by suppressing the increase in the wire density ρ outside the laminated hose 1, flexibility can be effectively enhanced. Therefore, according to the laminated hose 1, both pressure-resistant performance and oscillating durability performance can be effectively achieved.

In the laminated hose 1, the wire density ρ of each of the four reinforcing layers 12 is set to decrease from the first reinforcing layer 12a to the fourth reinforcing layer 12d. In the laminated hose 1, the wire density ρ1 of the first reinforcing layer 12a is the highest wire density, among the four reinforcing layers 12. The wire density ρ2 of the second reinforcing layer 12b is lower than the wire density ρ1 of the first reinforcing layer 12a. The wire density ρ3 of the third reinforcing layer 12c is lower than the wire density ρ2 of the second reinforcing layer 12b. The wire density ρ4 of the fourth reinforcing layer 12d is lower than the wire density ρ3 of the third reinforcing layer 12c. Therefore, in this embodiment, the wire density ρ4 of the fourth reinforcing layer 12d is the lowest among the four reinforcing layers 12.

Further, in the laminated hose 1, it is preferable that the winding angle A of the reinforcing wires 13 in each of the plurality of reinforcing layer 12 is between 40° and 70°. In this case, between 50° and 60° is particularly suitable.

Figure 3:
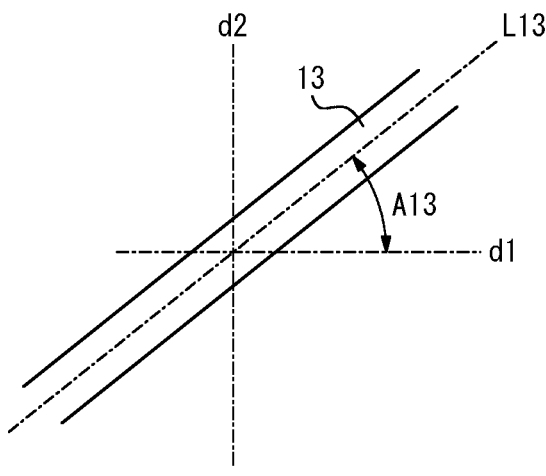
FIG. 3 schematically illustrates the wound state of the reinforcing wire taking, as an example, a portion of the reinforcing wire included in the reinforcing layer in FIG. 2.

FIG. 3 schematically illustrates the wound state of the reinforcing wire 13 taking, as an example, a portion of the reinforcing wire 13 included in the reinforcing layer 12 in FIG. 2. In the laminated hose 1, all of the reinforcing layers 12 from the first reinforcing layer 12a to the fourth reinforcing layer 12d are set so that the winding angle A13 of the reinforcing wires 13 is 50 degrees or more and 60 degrees or less. A specific example of the winding angle A13 of the reinforcing wire 13 is, as illustrated in FIG. 3, the acute side angle that the centerline L13 of the reinforcing wire 13 makes with respect to the extending direction d1 of the laminated hose 1. However, the winding angle A13 of the reinforcing wire 13 is not limited to this example. The winding angle A13 of the reinforcing wire 13 may be, for example, an obtuse side angle made with respect to the extending direction d1 of the laminated hose 1. The winding angle A13 of the reinforcing wire 13 may also be an obtuse or acute angle made with respect to the direction d2 (the radial direction of the laminated hose 1) that is perpendicular to the extending direction d1 of the laminated hose 1, in the plan view of the laminated hose 1.

Further, in the laminated hose 1, it is preferable that the wire density ρ of the reinforcing layer 12 in each of the plurality of reinforcing layers 12 does not exceed 100% when the laminated hose 1 is bent at a bending radius determined by the specifications of the laminated hose 1. In this case, the reinforcing wires 13 in the reinforcing layer 12 are less likely to interfere with each other when the laminated hose 1 is bent. Therefore, according to the laminated hose 1, oscillating durability performance can be further improved.

Figure 4:
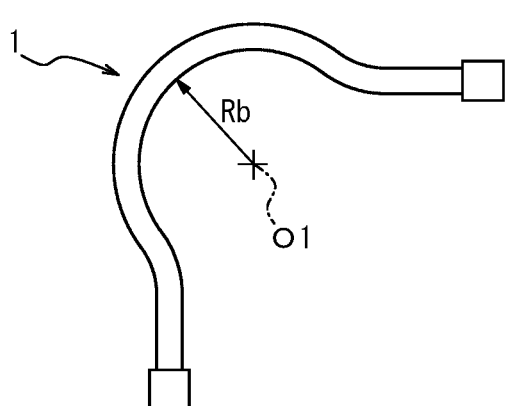
FIG. 4 schematically illustrates the bending state of the laminated hose of FIG. 1 when the laminated hose is bent with a bending radius Rb.

FIG. 4 schematically illustrates the bending state of the laminated hose 1 when the laminated hose 1 is bent with a bending radius Rb. The wire bending density ρb is the wire density ρ of the relevant reinforcing layer 12 when the laminated hose 1 is bent at the bending radius Rb determined by the specifications of the laminated hose 1. Specifically, the wire density ρ of the reinforcing layer 12 is the wire density ρ of the reinforcing layer 12 when the laminated hose 1 is bent and viewed from the inner circumference in the radial direction of bending to the outer circumference. The bending radius Rb, also called the allowable bending radius, is the limit of bending radius at which the hose can withstand the use as a laminated hose. The bending radius Rb is the radius of curvature generated at the innermost circumference in the bending radius direction of the laminated hose 1 when the laminated hose 1 is bent. The specifications of the laminated hose 1 include, for example, standards that are individually required each time the laminated hose is used, or standards that are predetermined by each hose manufacturer.

The laminated hose 1 is set so that the wire bending density ρb of the reinforcing layer 12 in each of the four reinforcing layers 12 does not exceed 100% when the laminated hose 1 is bent at a bending radius Rb determined by the specifications of the laminated hose 1. In the laminated hose 1, each of the four reinforcing layers 12 is configured so that all of the wire bending densities ρb of the four reinforcing layers 12 are substantially 100%.

Here, "practically 100%" means including an error of "−0.5" against 100%. Suitably, the error is "−0.3" against 100%, more suitably "−0.2" against 100%. That is, in the laminated hose 1, the wire bending density ρb of all four reinforcing layers 12, when the laminated hose 1 is bent at a bending radius Rb, is between 99.5% and 100%, suitably between 99.7% and 100%, more suitably between 99.8% and 100%.

Further, in the laminated hose 1, it is preferable that the laminated hose 1 is a wire spiral hose with the reinforcing wires 13 wound in a spiral shape. In this case, the reinforcing wire 13 in the reinforcing layer 12 can be arranged by wrapping them in a spiral shape. Thus, the laminated hose 1 can be manufactured simply.

The laminated hose 1 is a wire spiral hose. In the laminated hose 1, the reinforcing layer 12 is a spiral wire layer including at least one reinforcing wire 13 wound in a spiral shape. In this embodiment, the winding direction of the reinforcing wires 13 in the reinforcing layers 12 is opposite each other to the winding direction of the reinforcing wires 13 in the adjacent reinforcing layers 12.

EXAMPLES

Table 1 below shows Example 1 and Comparative Example 1.

TABLE 1

| | Example 1 | Comparative Example 1 |
|---|---|---|
| Hose bore size [mm] | 25 | 25 |
| Wire density ρ1 [%] | 93.4 | 96.2 |
| Wire density ρ2 [%] | 92.7 | 97.6 |
| Wire density ρ3 [%] | 92.1 | 98.2 |
| Wire density ρ4 [%] | 91.7 | 96.8 |
| Wire bending density ρb1 [%] | 99.9 | 102.9 |
| Wire bending density ρb2 [%] | 99.8 | 105.1 |
| Wire bending density ρb3 [%] | 99.8 | 106.4 |
| Wire bending density ρb4 [%] | 99.9 | 105.5 |
| Calculated breakdown pressure [MPa] | 159.0 | 169.0 |
| Oscillating impulse counts [ten thousand times] | 66.2 | 18.0 |

Example 1 is a laminated hose with four reinforcing layers 12. Comparative Example 1 is a laminated hose with four reinforcing layers.

In Table 1, the hose bore size is the inner diameter, i.e., diameter of inside, of the hose body 11. The unit is mm.

In Table 1, the wire densities ρ1 to ρ4 are, respectively, the wire density ρ of the first reinforcing layer 12a, the wire density ρ of the second reinforcing layer 12b, the wire density ρ of the third reinforcing layer 12c, and the wire density ρ of the fourth reinforcing layer 12d.

The wire bending densities ρb1 to ρb4 are, respectively, the wire bending density ρb of the first reinforcing layer 12a, the wire bending density ρb of the second reinforcing layer 12b, the wire bending density ρb of the third reinforcing layer 12c, and the wire bending density ρb of the fourth reinforcing layer 12d. The wire density ρ and the wire bending density ρb are percentages (%).

Furthermore, in Table 1, the calculated breakdown pressure is the limit pressure at which the laminated hose 1 will break down when a high-pressure liquid is pumped through it. The unit is MPa. The calculated breakdown pressure is an indicator for evaluating the pressure-resistant performance of the laminated hose 1. The higher the calculated breakdown pressure, the better the pressure-resistant performance. The calculated breakdown pressures in Example 1 are all 80 MPa or higher.

In addition, the oscillating impulse counts is the number of times the laminated hose 1 is bent with a bending radius Rb. The unit is ten thousand times. The oscillating impulse counts is an indicator for evaluating the oscillating durability performance of the laminated hose 1. The higher the oscillating impulse counts, the better the oscillating durability performance. The bending radius Rb of Example 1 is 140 mm. The bending radius Rb of Comparative Example 1 is 620 mm. The oscillating impulse counts in Example 1 is 600,000 or more.

In Example 1, the wire density ρ of the reinforcing layer 12, in all four reinforcing layers 12, is 90% or more and less than 96%. Similarly, in Example 1, the wire density ρ of the reinforcing layer 12, in all four reinforcing layers 12, is 90% or more and less than 95%.

Referring to Table 1, it can be evaluated that Example 1 has improved oscillating durability performance while ensuring pressure-resistant performance. Therefore, it is clear from Table 1 that Example 1 is able to achieve both pressure-resistant performance and oscillating durability performance.

Referring to Example 1, the four reinforcement layers 12 are configured such that the wire density ρ of the reinforcement layers 12 decreases from the first reinforcement layer 12a to the fourth reinforcement layer 12d.

Referring to Example 1, the laminated hose 1 has each reinforcing layer 12 such that all of the wire bending density ρb1 of the first reinforcing layer 12a to the wire bending density ρb4 of the fourth reinforcing layer 12d are substantially 100%.

Referring to table 1, in the Example 1, the wire bending density ρ of the fourth reinforcement layer 12d is substantially 100%.

The above describes an exemplary embodiment of this disclosure, and various changes can be made without departing from the scope of the claims. The various configurations employed in each of the above-mentioned embodiments can be replaced with each other as appropriate.

REFERENCE SIGNS LIST

1 Laminated hose
10 Outer layer
11 Hose body
12 Reinforcing layer
12a First reinforcing layer (innermost reinforcing layer)
12b Second reinforcing layer
12c Third reinforcing layer
12d Fourth reinforcing layer (outermost reinforcing layer)
12e Fifth reinforcing layer
12f Sixth reinforcing layer (outermost reinforcing layer)
S12 Unit area of the reinforcing layer 12
13 Reinforcing wire
A13 Winding angle of the reinforcing wires
14 Intermediate rubber layers
Rb Bending radius
ρ Wire density
ρb Wire bending density

The invention claimed is:

1. A laminated hose comprising a hose body and a plurality of reinforcing layers laminated on the outer circumferential side of the hose body, and each of the plurality of reinforcing layers includes a reinforcing wire, wherein
    a wire density of the reinforcing layer in all of the plurality of reinforcing layers is 90% or more and less than 96%, and a wire bending density of the reinforcing layer in each of the plurality of reinforcing layers does not exceed 100% when the laminated hose is bent at a bending radius determined by the specifications of the laminated hose, the wire bending density being the wire density of the reinforcing layer when the laminated hose is bent and viewed from an inner circumference in a radial direction of bending to an outer circumference and the bending radius being a radius of curvature generated at the innermost circumference of the laminated hose in the radial direction of bending when the laminated hose is bent.

2. The laminated hose according to claim 1, wherein the wire density of the reinforcing layer in each of the plurality of reinforcing layers decreases from the innermost reinforcing layer closest to the hose body to the outermost reinforcing layer farthest from the hose body.

3. The laminated hose according to claim 2, wherein a winding angle of the reinforcing wire in each of the plurality of reinforcing layers is 40° or more and 70° or less.

4. The laminated hose according to claim 2, wherein the laminated hose is a wire spiral hose including the reinforcing wire wound in a spiral shape.

5. The laminated hose according to claim 1, wherein a winding angle of the reinforcing wire in each of the plurality of reinforcing layers is 40° or more and 70° or less.

6. The laminated hose according to claim 5, wherein the laminated hose is a wire spiral hose including the reinforcing wire wound in a spiral shape.

7. The laminated hose according to claim 1, wherein the laminated hose is a wire spiral hose including the reinforcing wire wound in a spiral shape.

8. A laminated hose comprising a hose body and a plurality of reinforcing layers laminated on the outer circumferential side of the hose body, and each of the plurality of reinforcing layers includes a reinforcing wire, wherein a wire density of the reinforcing layer in all of the plurality of reinforcing layers is 90% or more and less than 95%, and a wire bending density of the reinforcing layer in each of the plurality of reinforcing layers does not exceed 100% when the laminated hose is bent at a bending radius determined by the specifications of the laminated hose, the wire bending density being the wire density of the reinforcing layer when the laminated hose is bent and viewed from an inner circumference in a radial direction of bending to an outer circumference and the bending radius being a radius of curvature generated at the innermost circumference of the laminated hose in the radial direction of bending when the laminated hose is bent.

9. The laminated hose according to claim 8, wherein the wire density of the reinforcing layer in each of the plurality of reinforcing layers decreases from the innermost reinforcing layer closest to the hose body to the outermost reinforcing layer farthest from the hose body.

10. The laminated hose according to claim 9, wherein a winding angle of the reinforcing wire in each of the plurality of reinforcing layers is 40° or more and 70° or less.

11. The laminated hose according to claim 9, wherein the laminated hose is a wire spiral hose including the reinforcing wire wound in a spiral shape.

12. The laminated hose according to claim 8, wherein a winding angle of the reinforcing wire in each of the plurality of reinforcing layers is 40° or more and 70° or less.

13. The laminated hose according to claim 8, wherein the laminated hose is a wire spiral hose including the reinforcing wire wound in a spiral shape.

* * * * *